(12) United States Patent
Godley (10) Patent No.: US 7,374,129 B2
(45) Date of Patent: May 20, 2008

(54) DEVICE FOR LAUNCHING A POWER KITE (75) Inventor: Mark Brian Godley, Vancouver (CA)

(73) Assignee: Liquid Sky Kiteboarding, Inc., Vancouver, British Columbia (CA)

( * ) Notice: Subject to any disclaimer, the term of this patent is extended or adjusted under 35 U.S.C. 154(b) by 604 days.

(21) Appl. No.: 11/098,093

(22) Filed: Apr. 4, 2005

(65) Prior Publication Data
US 2006/0049313 A1   Mar. 9, 2006

Related U.S. Application Data (60) Provisional application No. 60/611,086, filed on Sep. 17, 2004, provisional application No. 60/607,911, filed on Sep. 7, 2004.

(51) Int. Cl.
B65H 19/28 (2006.01)
A63H 27/00 (2006.01)

(52) U.S. Cl. ............... 242/587.2; 242/402; 244/155 A (58) Field of Classification Search ............. 242/400.1, 242/402, 405, 405.1, 405.2, 405.3, 587, 587.1, 242/587.2, 587.3, 388, 388.6; 244/155 A, 244/153 R
See application file for complete search history.

(56) References Cited

U.S. PATENT DOCUMENTS

| 3,138,356 | A |   | 6/1964 | McClain |
| 4,065,080 | A |   | 12/1977 | Alison ........................ 244/155 |
| 4,101,090 | A | * | 7/1978 | Wait, Jr. .................. 244/155 A |
| 4,129,273 | A | * | 12/1978 | Hill .......................... 244/155 A |
| 4,159,087 | A | * | 6/1979 | Moomaw ................. 244/153 R |
| 4,653,702 | A |   | 3/1987 | McGinnis |
| 4,796,827 | A | * | 1/1989 | Munt et al. ............. 244/155 A |
| 5,024,401 | A | * | 6/1991 | Nakashima ............... 242/405.3 |
| 5,127,612 | A |   | 7/1992 | Onstott ........................ 244/155 |
| 6,260,803 | B1 | * | 7/2001 | Hunts .......................... 242/405 |
| 2004/0065780 | A1 |   | 4/2004 | Bellacera ..................... 244/155 |

* cited by examiner

Primary Examiner—William A Rivera (57) ABSTRACT

A device is provided for the management of multiple lines attached to a bar, of the type used in power kites for kiteboarding. The device is formed of an elongate body having a shaft region, a spool region adjacent the shaft region and distal thereto, and a line retaining region distal to the spool region. The shaft region has a hollow body having a longitudinal groove running from a proximal opening to a distal end point, and a bar retaining means for retaining a bar against rotational or axial movement. The spool region has a spool shaft defined by proximal and distal containment means for retaining spooled lines wound about the spool shaft. A line retaining region has a means for separately retaining one or more lines of a plurality of lines.

13 Claims, 7 Drawing Sheets

DEVICE FOR LAUNCHING A POWER KITE

This application claims priority under 35 USC 119(e) of U.S. Ser. No. 60/607,911, filed Sep. 7, 2004, and U.S. Ser. No. 60/611,086, filed Sep. 17, 2004.

BACKGROUND OF THE INVENTION

The present invention relates to a device for managing the lines of an object having multiple lines. Specifically, the device is directed toward line management of a multiple line kite, particularly those kites and related apparatus used in the sport of kiteboarding or kitesurfing. The device of the invention aids in storing the multiple lines and attached control bar in a manner which allows for the lines to be separated and clearly marked for easy attachment to a kite prior to use, all within a reduced deployment area. Upon deployment of the kite in the wind, the device further aids in managing the lines in a controlled unwinding and automatic disengagement from the device.

The sport of kiteboarding or kitesurfing has been rapidly gaining in popularity over the last few years. Relatively large wing-like traction kites, some versions being inflatable, are controlled by multiple lines attached to a control bar. In a common version, four lines are present, with two attached to the front or leading edge of the kite on either later side, and two to the rear or trailing edge. Kites of this type are shown in US 2003/0154898; US 2003/0154898, US 2002/0088385 and US 2002/84384. However, some kites may have from 2 up to 5 or more lines. The user grasps the control bar, which may be further attached to a harness worn by the user. The user's feet are engaged in a board for skimming or 'surfing' along the surface of the water as the kite and user are pulled by the wind.

Because of the high speeds and force generated by the wind in conjunction with the kite, the activity can be dangerous. Particularly difficult is the beginning stage, when the user must deploy the kite into the wind. It is quite difficult to keep the kite and its four or more lines (up to about 50 meters in length) from prematurely deploying in the wind, or from tangling prior to or during deployment. Furthermore, once the activity is completed, it is difficult to detach the lines from the kite and thereafter store and manage the lines in a manner which avoids tangling and disorientation, wherein the proper lines can not be easily matched with the proper kite position for attachment.

There is a need for a device which can improve management and storage of multiple lines for power kites, and improve the ability to reattach the lines to a kite. There is a further need for a device which can assist in maintaining the lines organized and tangle-free during deployment of the kite, while also permitting deployment in a relatively small area. Thus, there is a need for a device which will allow for launch of a kite with only a relatively short length of the full lines deployed, which is particularly useful in crowded areas of the water or beach, in short launch areas, or in connection with launch from a boat.

SUMMARY OF THE INVENTION

Accordingly, the present invention provides a device for the management of multiple lines attached to a bar, of the type used in power kites for kiteboarding. The device is formed of an elongate body having a shaft region, a spool region adjacent the shaft region and distal thereto, and a line retaining region adjacent and distal to the spool region. The shaft region has a hollow body having a longitudinal groove running from a proximal opening to a distal end point, and a bar retaining means for retaining a bar against rotational or axial movement. The spool region has a spool shaft defined by proximal and distal containment means for retaining spooled lines wound about the spool shaft. A line retaining region has means for separately retaining one or more lines of a plurality of lines.

DETAIL DESCRIPTION OF THE INVENTION

Figure 1:
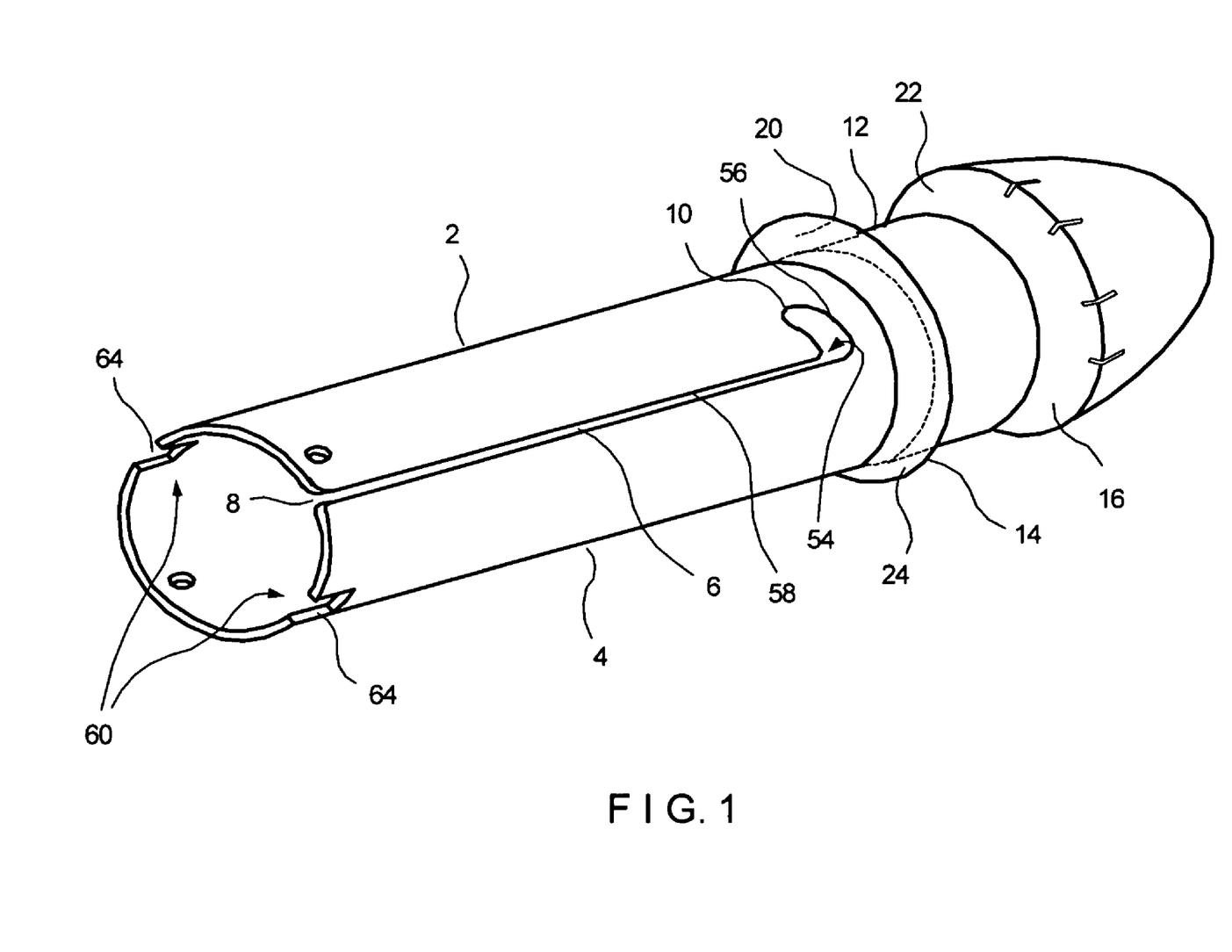
FIG. 1 is a perspective view of the device of the invention.
Figure 2:
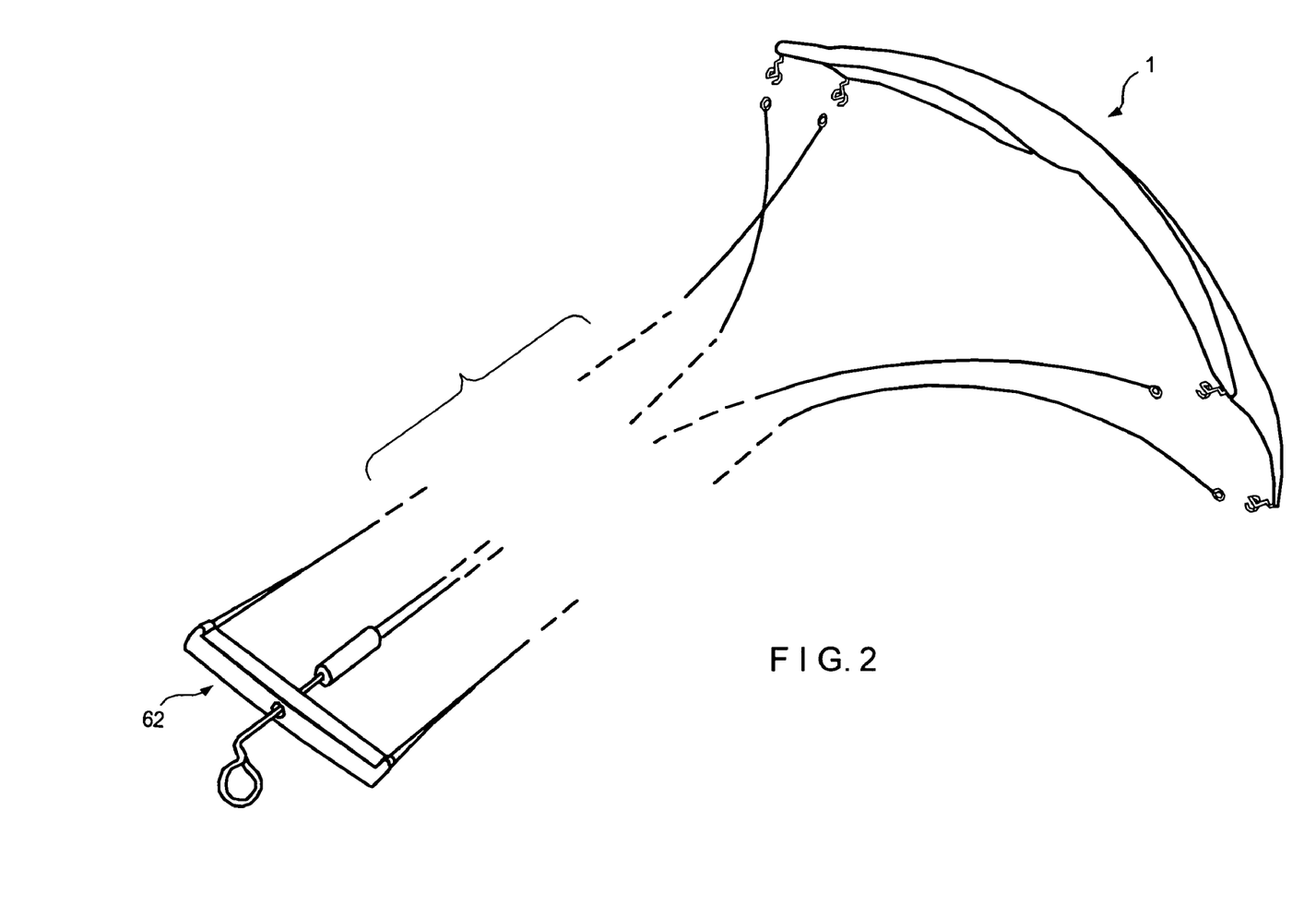
FIG. 2 is a schematic view showing a power kite attached to lines and a bar, which may be used in conjunction with the device of the invention.
Figure 3A:
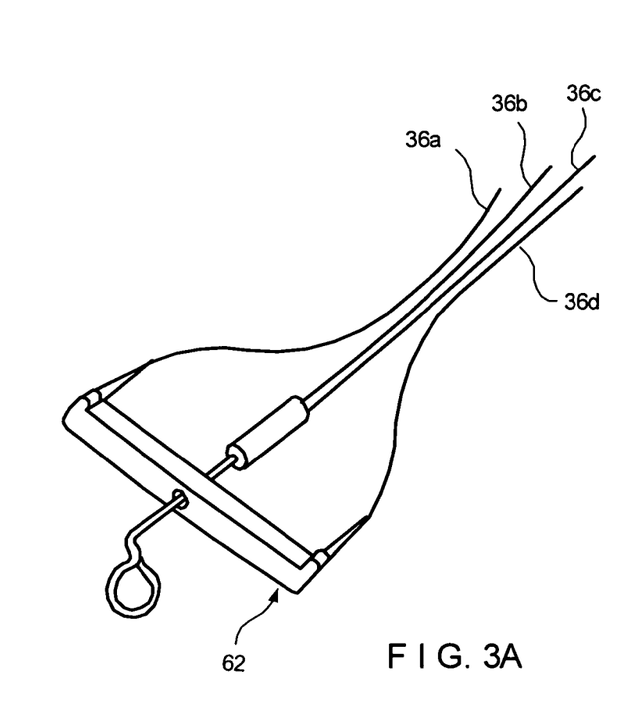
FIG. 3A shows a step in the use of the device, in which the lines are gathered together near the base of the lines connected to the bar.
Figure 3B:
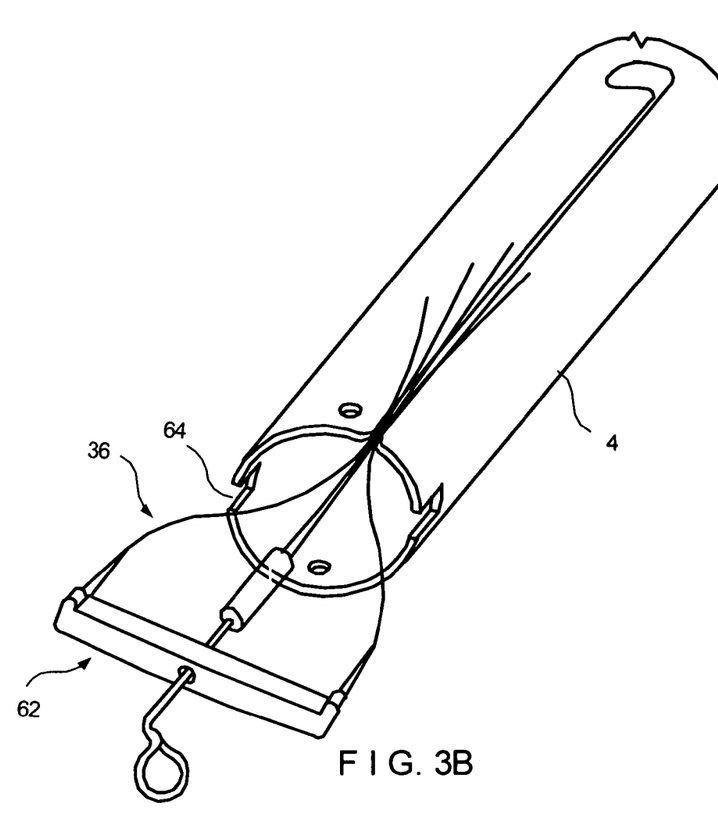
FIG. 3B shows a step in which the gathered lines are together pulled through the opening of the shaft groove of the device.
Figures 8, 9:
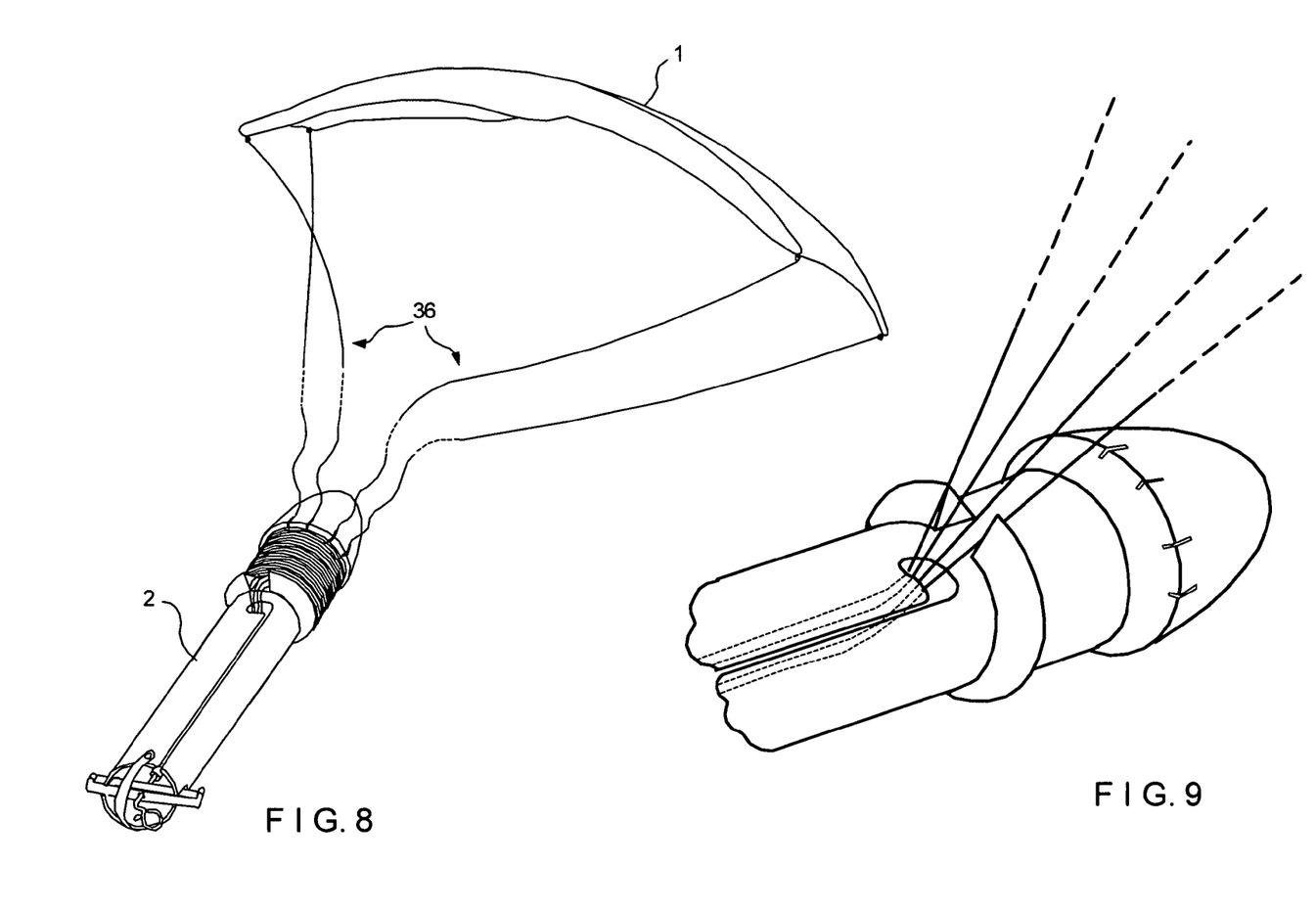
FIG. 8 is a schematic drawing showing a launching action of the kite from the device.
FIG. 9 shows the lines sliding out from the groove, being pulled by the kite during launch.

With reference to FIGS. 1 and 8, for managing the lines 36 of a kite 1 and aiding in the deployment of a kite, an elongate body 2, preferably approximating a hollow cylinder, is provided. The body has a shaft portion 4 having a retaining means, preferably in the form of a narrow groove 6 running longitudinally from an opening point 8 at the proximal end of the body 2 to an end point 10 of the groove 6 located distally in the region of the spool 12. Distally from shaft 4 is a spool 12 or winding region, preferably bounded between two spaced apart circumferential projections 14, 16 for retaining therebetween lines 36 wound around the spool region 12. The respective side walls 20, 22 of the proximal and distal circumferential projections 14, 16 are preferably sloped away from the spool region 12, to allow for an ease of unwinding during the deployment phase. Likewise, the proximal face 24 of the proximal circumferential projection 14 may also be optionally sloped toward the spool region 12, to allow for an ease of transition of the lines from the shaft region 4 to the spool region 12.

Distal from the spool region 12 is the retaining region 30, which has a means 34 for separately retaining each of the lines. The retaining means can be any structure which can securely but simply retain a line, while also allowing for simple and quick separation of the line from the retaining means. In the embodiment shown in FIGS. 6 and 7, the retaining means is formed simply as short longitudinal grooves 34 extending across the distal spool region projection 30. Each line 36a-d (a 4-line version is shown, with 4 corresponding grooves) is pulled into a corresponding groove 34a-d, each of which is formed to be narrow enough to grasp and frictionally retain the line, while allowing for release of the line by pulling with a threshold force. The separation of the lines is important during storage and disassembly of the kite, in order to keep the lines directly associated with the correct location on the kite. In this regard, each of the retaining means may bear an indicator so that the correct line can be retained in that groove. Preferably, the retaining means are arranged along a circumferential line, and bear indicators which correspond in location to the attachment points on the kite. As an example, for a four-line kite, there would be four retaining means or grooves, with indicators stating rear left, front left, front right, rear right.

While grooves are shown as one of the illustrated retaining means, it is contemplated that other means could also be effective as will be appreciated by those skilled in the art, for example: a plurality of hooks around which each line could be wound; a plurality of pairs of opposing leaf spring arms which could grip the lines; hook and loop-type fasteners for grasping the lines. However, the design should be such that, upon launch of the kite and corresponding unwinding of the lines, the retaining means should preferably allow for self-release of the lines upon a pulling force from the kite.

Figures 10A, 10B, 10C, 10D:
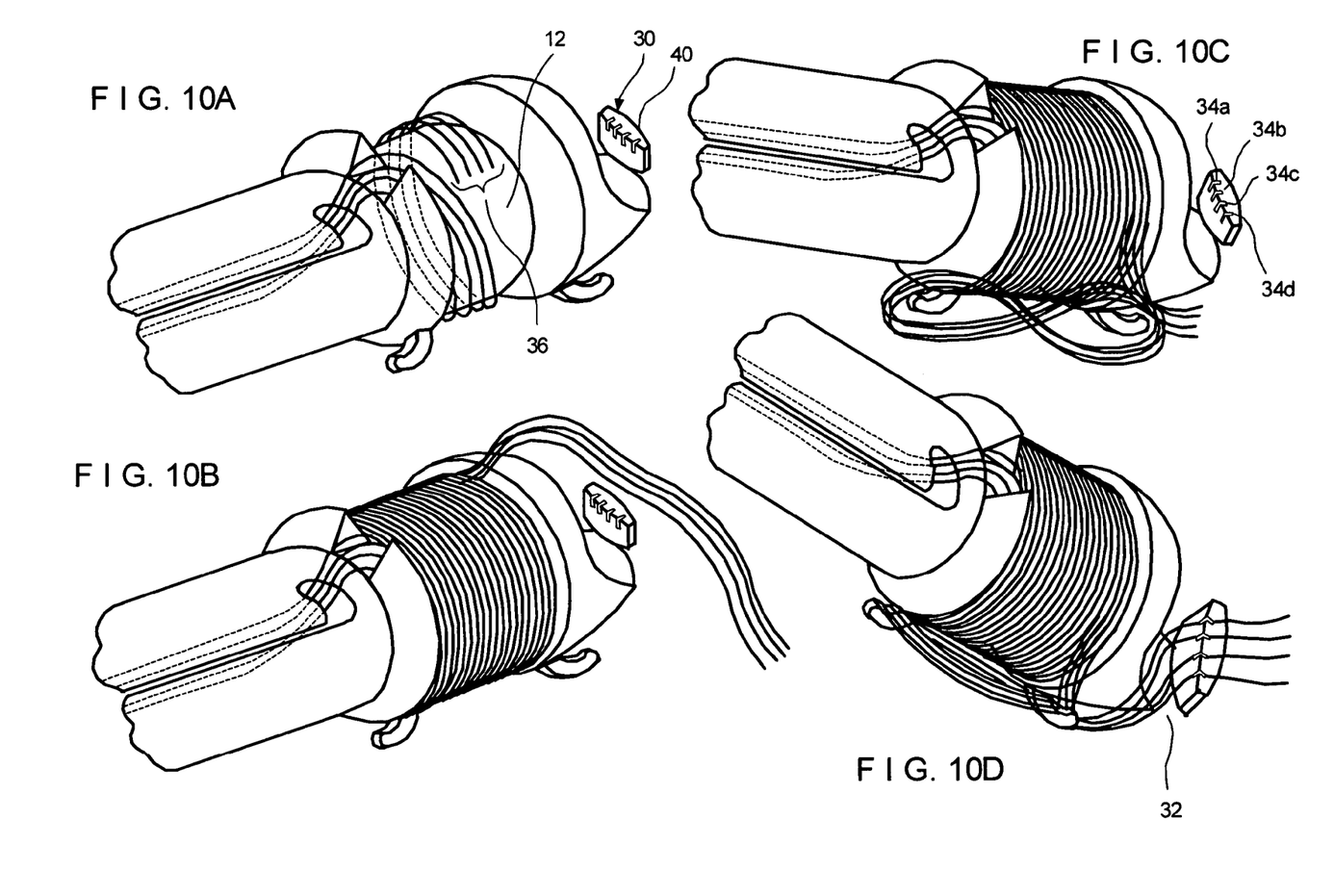
FIGS. 10A-10D show a preferred embodiment of the invention, in a sequence of steps showing winding and storage of the lines thereon.

A particularly preferred embodiment of the retaining means is shown in FIG. 10, a nose 40 is provided, preferably extending beyond the distal end of the body, so that the lines 36 may contact the nose as they extend distally toward a kite from a wound position on the spool 12. The nose preferably is formed of a resilient material, such as a Santoprene® thermoplastic elastomer (TPE) material, or Neoprene® synthetic rubber, which is temporarily deformable when a line 36 is pressed thereon, but which then resiliently retains the line within the deformed groove formed from the manual pressure exerted by the line. This may be repeated for each of the lines 36 in a laterally spaced apart location upon the nose. The nose material is such that, while the lines are retained therein by a manual compression force, they are readily separated from the nose by an opposite manual force, or for example, by a force exerted on the lines during deployment of the kite. It is also an option to include pre-formed spaced apart grooves 34 in the nose 40 formed of resilient material, which will act as discrete retaining means elements, in similar fashion to the embodiment of FIG. 6.

Figures 4, 5:
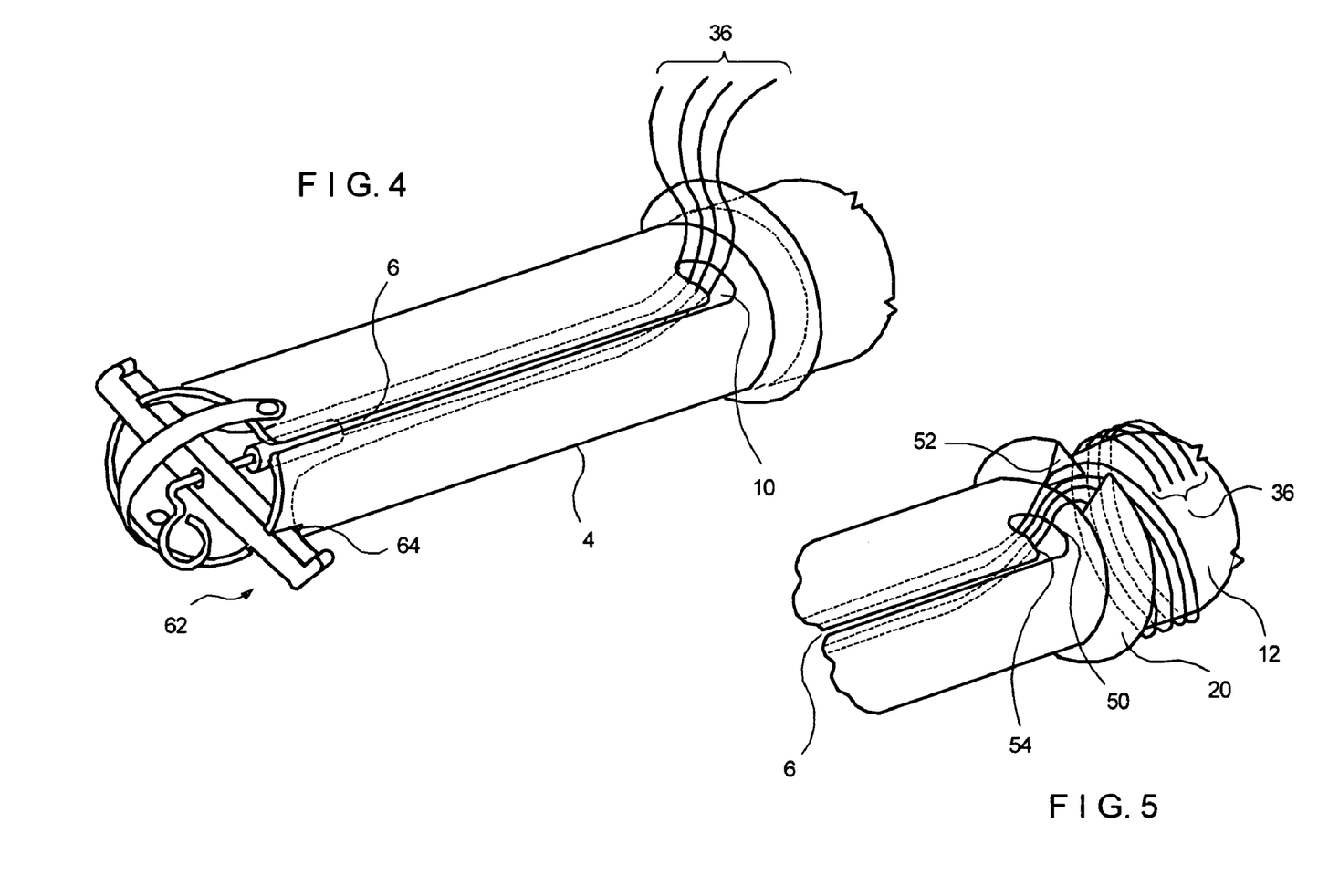
FIG. 4 shows a step in which the bar resides in the notches and the lines are pulled through the shaft groove and out toward the spool.
FIG. 5 shows a detail demonstrating the winding direction and transition of the lines from the shaft groove to the spool, through a notch in the spool containment projection.

Returning to the shaft portion, the distal end 56 of the retaining groove 6 may be simply an abutment. However, it is beneficial to fashion the end of the groove 6 with a turn from the longitudinal direction towards the circumferential direction. In this manner, the lines 36 being pulled through the groove 6 in the distal direction can be directed onto the spool region 12 already in a circumferential winding direction. As shown in FIG. 5, to further facilitate the transition of the lines from the groove 6 on the shaft to the spool region 12, a generally longitudinal notch 52 or opening in the proximal spool projection 24 can be provided in the region of the distal groove end 56.

The transition of the groove from longitudinal to circumferential direction is preferably achieved with a rounded inside corner 54 so that the lines do not get caught during the transition, either during the winding phase, or during the deployment phase where the lines must be quickly unwound and released as the kite takes flight. Likewise, it is beneficial if the circumferential portion 56 is in fact sloped downward continuously toward the longitudinal portion 58 to allow for movement of the lines without interference during both the storage phase and the deployment phase.

With reference to FIGS. 1 and 4, the proximal end of the shaft contains a bar retaining means 60 for securely retaining a control bar of a kite. The structure of the bar 62 of a kite is well known, as set forth above in the referenced prior art, and generally comprises an elongate rigid bar, preferably with a circular or rounded cross-section. The bar retaining means 60 is structured to snugly retain the bar against rotation about the axis of the shaft as well as against movement in the longitudinal direction of the shaft of the device. The bar retaining means is preferably in the form of two notches 64 in opposing sides of the proximal end of the shaft, which notches conform in shape to the outer dimension of the bar. Other structures may also accomplish this purpose, such as protruding hooks or grasping leaf spring extensions from the proximal end of the shaft. Thus, the bar should be held in the notches, against an abutment portion thereof, as the lines are pulled taught in the distal direction. While the winding operation of the lines will pull the bar against the notch abutments so that the bar is not likely to move out of the notches in the proximal direction, an optional embodiment may fashion the notches to retain the bar independently from movement along the axis of the shaft in the proximal direction. If the cylinder is made from a pliable material, the notches can be created with a dimension slightly smaller than that of the bar, so that the bar is squeezed within the notch. Alternatively, the proximal ends of the notch can be slightly smaller than the bar dimension and the notch itself, to allow the bar into the notch only upon a deformation of the notch ends, which then spring back to form a retaining enclosure. A further alternative is a strap 68 (FIG. 7) or other releasable means for retaining the bar against the abutment. Such a strap or straps may be of a flexible but strong material, and may be fixed on side of the proximal end region of the shaft, and attachable to the other side, stretched or deployed around the bottom of the bar when the bar is placed within the retaining notches. There should preferably be a strap on either lateral side of the bar. The strap may be attachable by a snap, hook and loop, or other known attachment means. Alternatively, the strap may be in the form of a rigid bar or wire device, shaped or bent to accommodate the bar and/or end face of the hollow body, which may swing open from a pivot or hinge point on one lateral side, and which is attachable to the other lateral side.

At the proximal end of the shaft, the groove opening 8 preferably widens toward the end, to allow the lines to be easily enter the groove (FIGS. 1, 3A, 3B, 4). As the device is secured to the lines and bar, with the bar being placed retainingly into the notches, the user will grasp the plurality of lines together near their attachment point to the bar, and bring the lines together toward the longitudinal center of the bar. When the bar is brought toward the notches, the lines are roughly within the diameter of the hollow cylindrical shaft. The lines are then brought together from inside the diameter, into the groove opening with a generally lateral orientation of the lines. With the lines being grasped from outside the cylinder, they are pulled up through the groove to the distal groove end. The width of the groove should be enough to allow for the plurality of lines to be pulled through with relative ease, but is preferably also narrow enough to apply a slight pressure against the group of lines to assist in keeping the lines together for the spooling operation. Again, for this reason, it is preferable that the hollow cylindrical shaft region be made of a strong but lightweight material, such as PVC, thin sheet metal, or the like.

As the lines are pulled together through the groove, they will eventually be pulled taught as the bar is held against the abutment of the retaining notches. The lines are then pulled up through the hollow cylinder to the distal end of the groove, with the portion of the lines residing from the bar up to the distal groove end staying inside the hollow cylinder. At this stage, the lines can be wound, still together as a single grouping, around the spool region. See FIGS. 5-7.

To aid in insuring that the lines do not become tangled during or after the winding operation, the winding about the spool region may be transitioned to a figure-eight winding about two optional longitudinally spaced-apart extensions 70 adjacent the proximal and distal edges of the spool region.

Figures 6, 7:
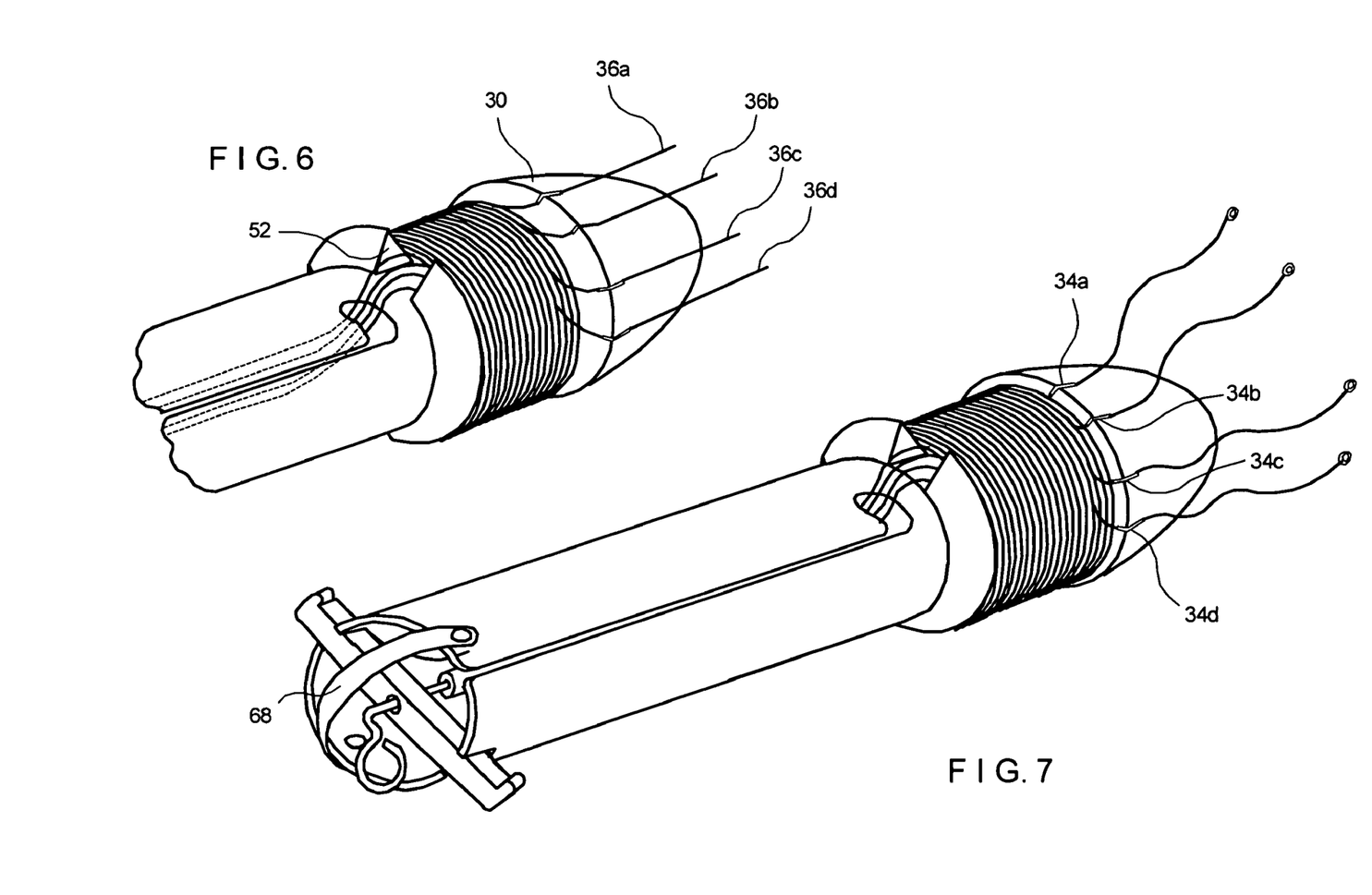
FIG. 6 shows a detail of the distal end of the device, having the lines wound about the spool region and retaining with the line retaining means.
FIG. 7 shows the device with bar and lines retained and managed, with the lines detached from the kite, prior to final winding of the line ends.

With reference to FIGS. 6, 7 and 10, as the end of the lines is reached during the spooling operation, still leaving a sufficient length to manage the detachment (and later reattachment) of the kite itself, but leaving the lines close enough to the kite such that the user can readily identify which line is belongs to which attachment point, the lines are visually identified (either by observing the actual attachment point, or by other indicia on the lines the lines themselves such as labels or colors) and secured separately within the corresponding retaining grooves (see FIGS. 10C, 10D).

As an aid in transitioning from the spool region to the retaining region, the spool region may optionally contain a transitioning means, such as a radial projection near the distal end of the spool region, and preferably centrally located with respect to the spaced apart retaining grooves. The radial projection can act to 'turn' the winding from a circumferential action to an axially directed action in correspondence with the preferably axially oriented retaining grooves. Thus, as the winding operation nears completion, preferably winding towards the distal circumferential projection, the winding of the lines together can wrap around the radial projection and pull against the proximal side thereof towards the retaining grooves. It should be understood that such radial projection should preferably be rounded or sloped in the region of contact with the lines, so that automatic unwinding during launch is not hindered.

The remainder of the lines can then be gathered together for further winding about the device or placement within the hollow cylinder. An optional embodiment may also have an opening for storage of the remainder of the lines with our without the kite portion (attached or unattached) within a hollow head portion.

When the kite is ready for deployment, the lines can be unwound or exposed up to the retaining grooves. See FIG. 7. The separate lines, identified by the correspondingly marked grooves, are then attached to the kite (FIG. 8). As opposed to attachment operation without the aid of the device, this can be done with the device in a relatively short distance, as the remaining length of the lines is wound up and stored on the device. Once the kite is attached, the deployment can actually begin even while the remaining length of the lines are still wound about the device. Either by action of the wind acting on the kite (or by having someone manually pull the kite) while the user holds the bar (optionally in or out of the retaining notches), the kite pulling in the distal direction will unwind the lines around the spool (FIG. 9). As the lines finish unwinding from the spool, the lines are pulled from the distal end of the groove and out in the proximal direction toward the opening. As the lines exit the opening, the device is set fee from the kite and the lines. The device can then drop into the water for later retrieval, or can drop to the side of the user if attached by a tether or the like. In this regard, it is noted that the generally hollow interior head of the device (i.e. any portion including the spool region and a region distal therefrom) can be filled with or contain a lightweight buoyant flotation material, such as Styrofoam® or the like, so that the device will float. To effectuate a smooth release from the device, the circumferentially oriented distal end portion of the groove can optionally transition to the axial portion of the groove in a relatively smooth turn, sloped continuously from the circumferential portion to the axial portion. In this way, the lines will easily dislodge from the circumferential end portion of the groove toward eventual release at the proximal opening.

What is claimed is:

1. A device for the management of multiple lines attached to a bar, comprising:
    an elongate body comprising a shaft region, a spool region adjacent the shaft region and distal thereto, and a line retaining region distal to the spool region,
    the shaft region comprising a hollow body having a longitudinal groove running from a proximal opening to a distal end point, and a bar retaining means for retaining a bar against rotational or axial movement,
    the spool region comprising a spool shaft defined by proximal and distal containment means for retaining spooled lines wound about the spool shaft,
    the line retaining region comprising a means for separately and removably retaining one or more lines of a plurality of lines.

2. The device of claim 1, wherein the bar retaining means comprises notches located in opposite lateral sides of a proximal end face of the hollow body, each of said notches having an abutment face against which the bar is pressed when retained therein.

3. The device of claim 2, wherein the retaining means further comprises a detachable retaining means which is closeable around the bar when the bar resides in the notches, which detachable retaining means is structured to provide a biasing force on the bar against the abutment face.

4. The device of claim 2, wherein the retaining means is elastically deformable and shaped to retain the bar therein.

5. The device of claim 1, wherein the groove widens in a direction of the opening.

6. The device of claim 1, wherein the groove runs in a generally longitudinal direction from opening, and transitions to a generally circumferential end region.

7. The device of claim 1, wherein the transition from the longitudinal direction of the groove to the circumferential end region curves to allow for smooth movement of lines therethrough.

8. The device of claim 1, wherein the proximal and distal containment means of the spool region comprise circumferential projections.

9. The device of claim 8, wherein the proximal circumferential projection has proximal and distal lateral sides which slope upward from the device body toward a circumferential center of the projection.

10. The device of claim 1, wherein the proximal circumferential projection has an axially oriented opening therein located in a region adjacent the end of the shaft groove.

11. The device of claim 1, wherein each of the line retaining means comprises a generally axial groove structured to frictionally retain one or more lines therein.

12. The device of claim 1, wherein the line retaining means comprises a deformable surface portion.

13. The device of claim 1, wherein each of the line retaining means is marked with an indicia corresponding to a particular line.

* * * * *